United States Patent [19]

Rolstad

[11] 4,439,396
[45] Mar. 27, 1984

[54] MULTIJUNCTION DIFFERENCE THERMOCOUPLES FOR GAMMA SENSORS

[75] Inventor: Erik Rolstad, Halden, Norway

[73] Assignee: Scandpower, Inc., Bethesda, Md.

[21] Appl. No.: 256,992

[22] Filed: Apr. 24, 1981

[51] Int. Cl.³ .................. G21C 17/00; G01H 25/00
[52] U.S. Cl. .................................. 376/247; 374/10; 374/30
[58] Field of Search ............ 136/211; 376/247; 374/10–13, 30

[56] References Cited

U.S. PATENT DOCUMENTS

| | | | |
|---|---|---|---|
| 1,528,383 | 3/1925 | Schmidt | 374/30 |
| 2,896,442 | 7/1959 | Bailly | 374/10 |
| 3,059,471 | 10/1962 | Calvet | 374/10 |
| 3,199,352 | 8/1965 | Macatician | 374/30 |
| 3,626,583 | 12/1971 | Abbott et al. | 136/211 |
| 3,802,925 | 4/1974 | Suga | 136/211 |
| 3,858,433 | 1/1975 | Nearhoof | 374/10 |
| 4,255,961 | 3/1981 | Biltonen et al. | 374/12 |

*Primary Examiner*—Sal Cangialosi
*Attorney, Agent, or Firm*—Eric P. Schellin

[57] ABSTRACT

Thermocouple junctions located in the hot and cold regions of an elongated heat conductive body extending through a measurement zone of a power monitoring device, are interconnected in series to provide a differential temperature signal of increased signal strength and fast signal response. The signal is free of the error heretofore arising from asymmetrical axial heat flow through the heat conductive body.

14 Claims, 8 Drawing Figures

MULTIJUNCTION DIFFERENCE THERMOCOUPLES FOR GAMMA SENSORS

BACKGROUND OF THE INVENTION

This invention relates generally to local power monitoring assemblies of the type disclosed in prior co-pending application, Ser. No. 888,881, filed Mar. 21, 1978, now U.S. Pat. No. 4,298,430 and owned in common with the present application. More particularly the present invention is an improvement residing in the differential temperature sensing arrangement associated with such power monitoring assemblies.

Generally, two signal producing junctions of a thermocouple device have been utilized in each of the measurement zones monitored by gamma ray sensors to which the aforementioned prior application relates. The thermocouple junctions have been located within a central bore of the elongated heat conductive body of the sensor at axially spaced locations within adjacent hot and cold regions of each measurement zone to produce a differential temperature signal from which heat flow rate may be determined reflecting local power generation in a nuclear reactor. In an axial heat flow arrangement, a hot junction is located centrally within the hot region of the zone or midway between the adjacent cold regions on the assumption that a symmetrical temperature gradient is established within the measurement zone with a peak temperature occurring at the location of the hot junction. However, conditions may develop in such heat flow rate monitoring assemblies which cause asymmetrical axial heat flow in the hot region producing an asymmetrical temperature distribution and a shift in the peak temperature point from the axial center location of the hot junction as well as a temperature differential between the cold regions. The differential temperature signal produced by the two thermocouple junctions will thereupon be affected by a signal error which makes heat flow rate determination inaccurate.

Furthermore, the foregoing two junction thermocouple arrangements depend on substantial gamma radiation generated heating for the production of a signal of measurable strength particularly where there is a noise level problem. In connection with radial heat flow types of sensors utilized in boiling water reactor installations, there may be a signal strength problem. Heretofore, gas chambers and multi-component units have been utilized to provide signal gain in such a situation.

Another problem associated with such two junction thermocouple arrangements resides in signal response to changes in heat flow rate. This is of particular concern in boiling water reactor installations where the signal level must be sufficiently high to trigger safety circuits. To increase signal response speed, the mass of the heat conductive body in the measurement zone may be reduced. However, such radiation in mass results in a decrease in signal strength toward noise level and is an unsatisfactory compromise.

It is therefore an important object of the present invention to provide a differential temperature sensing device for heat flow rate monitoring assemblies which will cope with the aforementioned problems of signal error due to asymmetrical heat flow, low signal strength, and signal response to changes in heat flow rate.

SUMMARY OF THE INVENTION

In accordance with the present invention, a multiple junction type of thermocouple sensing device is utilized wherein more than two junctions connected in series produce a resultant signal derived from one measurement zone through which the heat conductive body extends. In an axial heat flow sensor, two hot junctions are aligned with each other in the hot region of the measurement zone equally spaced between the adjacent cold regions on opposite axial sides. A single cold junction is located in each cold region at the axial sides of the hot region. The hot region is coextensive with a reduced diameter portion of the heat conductive body forming a high thermal resistance space within the measurement zone. In another embodiment, two adjacent reduced diameter portions of a sensor body have all of the junctions associated therewith interconnected in series for monitoring a single measurement zone. In yet another embodiment, signal strength is increased by having a single cable enclosing a plurality of thermocouple junctions to form several loop portions passing through a common hot region of a measurement zone in parallel spaced relation to each other while the junctions in the loop ends are located in the cold regions.

As a result of the foregoing arrangements of thermocouple junctions, signal strength is increased and asymmetrical signal errors canceled in the resultant signal output of axial heat flow types of sensors. Further, the resultant signal strength may be made large enough relative to signal noise despite increases effected in signal response by reducing the mass of the heat conductive body in the measurement zone through a decrease in the axial length of the thermal resistance gap in the sensor body. With respect to radial heat flow types of sensors, the technique of the present invention may be utilized to raise signal level without increasing sensor mass and achieve a faster signal response at a suitable signal level.

BRIEF DESCRIPTION OF DRAWING FIGURES

DETAILED DESCRIPTION OF PREFERRED EMBODIMENTS

Figure 1:
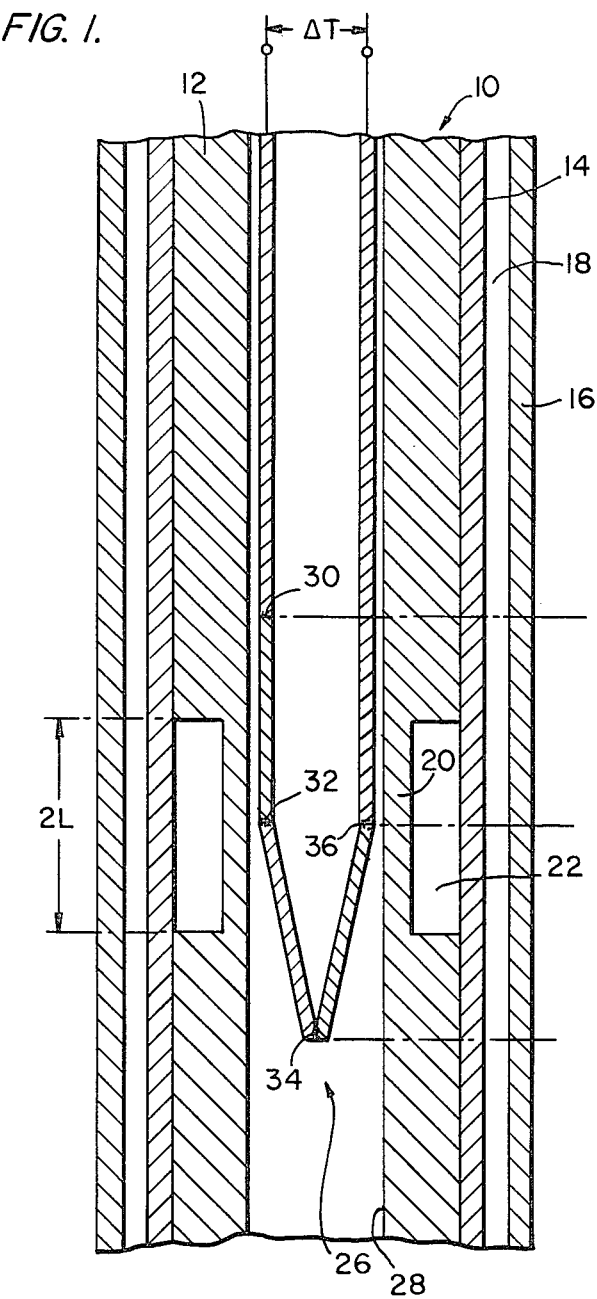
FIG. 1 is a partial side section view of a sensor assembly in accordance with an axial heat flow embodiment of the invention.

Referring now to the drawings in detail, FIG. 1 illustrates a somewhat simplified longitudinal section of a typical gamma ray sensor of the axial heat flow type disclosed in prior U.S. Pat. No. 4,298,420, aforementioned, generally referred to herein by reference numeral 10. In this type of sensor, which is suitable for a pressurized water reactor installation, an elongated cylindrical body 12 is made of a gamma radiation absorbing material such as stainless steel and is enclosed by a tubular heat sink jacket 14 which is cooled by water inside a guide tube 16. Heat generated within the body 12 in response to absorption of gamma radiation produces radial heat flow except for the axial heat flow pattern occurring within reduced diameter portions 20 of the body. The portions 20 form spaces 22 of high thermal resistance within jacket 14 to produce deviations in heat flow in thermal as well as electrical resistance of the elongated body 12. By measuring the difference in internal body temperature between a location in portion 20 and a location outside but adjacent to the space 22, the heat flow rate may be determined which reflects local power generation for the measurement zone within which the space 22 is located. The temperature difference is measured by means of a differential temperature sensing device generally referred to by reference numeral 26 mounted within a central bore 28 formed within the body 12.

In accordance with one embodiment of the present invention, the differential temperature sensing device 26 is of the multiple junction thermocouple type wherein electrical signal producing junctions between dissimilar metals, such as cromel and alumel, are positioned within each measurement zone. The measurement zone includes a hot region substantially coextensive with the space 22 having a predetermined axial length (2L) and two cold regions on either side of the hot region. The four thermocouple junctions associated with each measurement zone are connected in series and consist of a first junction 30 located on one axial side of a second junction 32 which is located midway within the portion 20. The third junction 34 at the tip of the thermocouple device is located on the other axial side of the junction 32 and spaced therefrom in an axial direction equal to the spacing of the first junction 30 from junction 32. The fourth junction 36 is axially aligned with the second junction 32. Thus, junctions 32 and 36 are hot junctions for the same hot region of the measurement zone while the junctions 30 and 40 are cold junctions sensing the temperature of the body 12 within cold regions of the measurement zone on both axial sides of the space 22.

Figure 2:
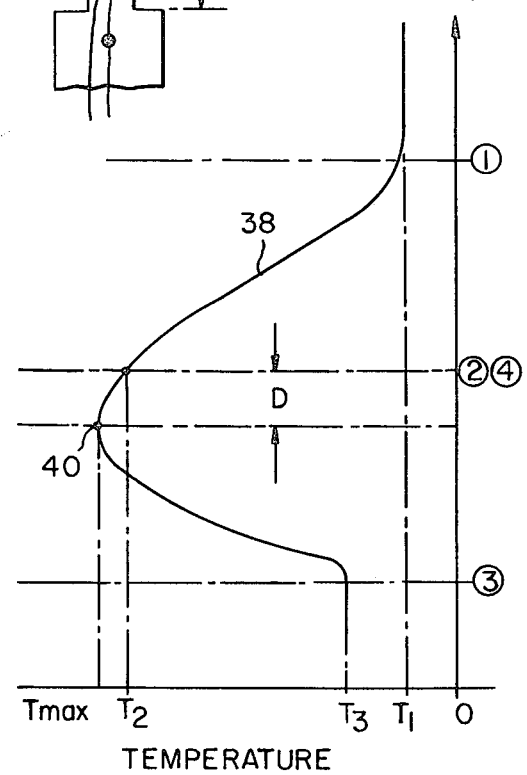
FIG. 2 is a graphical representation of the temperature gradient associated with the assembly shown in FIG. 1.

Heat flow to the heat sink at the axial locations of the thermocouple junctions is often distributed by asymmetrical axial heat flow through the portion 20 of the body 12 because of irregular or intermittent thermal contact in gap 18 resulting, for example, from deposits of foreign matter therein. Such asymmetrical heat flow conditions within the measurement zone produces a non-symmetrical temperature gradient as depicted by curve 38 in FIG. 2 wherein the peak temperature at point 40 is offset by an amount (D) from the otherwise symmetrical location of the hot junctions 32 and 36.

Where a single differential thermocouple device is utilized, the hot junction temperature (T2) and only one cold junction temperature (T1) are sensed to produce a differential temperature signal ($\Delta Ts$). Under the asymmetrical heat flow condition aforementioned, a signal error is therefore introduced as indicated by the following equation derived from the laws of thermal conduction:

$$\Delta Ts = \frac{WL^2}{8K} - \frac{WADL}{2K}$$

(W) is the volumetric heat generation rate, (A) is the cross-sectional area of the body and (K) is its thermal conductivity constant in the foregoing equation. The expression (WADL/2K) represents the signal error. However, since the double differential thermocouple device 26 associated with the present invention senses temperatures (T1 and T3) through cold junctions 30 and 34 on both sides of the hot junction, a differential temperature signal ($\Delta T$) is obtained because of the series connection of the junctions in accordance with the following expression:

$$\Delta T = (T2 - T1) + (T2 - T3) = \left(\frac{WL^2}{8K} + \frac{WADL}{2K}\right) + \left(\frac{WL^2}{2K} - \frac{WADL}{2K}\right)$$

or $$\Delta T = 2\left(\frac{WL^2}{8K}\right) = 2 \Delta Ts \text{ (ideal)}$$

It will therefore be apparent that the double differential thermocouple device produces a differential temperature signal that is twice the signal strength of a single differential thermocouple device. Furthermore, the signal error (WADL/2K) cancels out, so that $$\Delta T = WL^2/4K$$

to enable one to accurately determine the heat flow rate (W) from the differential temperature signal ($\Delta T$) whether or not heat flow is symmetrical.

It will be apparent that changes in temperature differential signal will lag changes in power in accordance with a thermal response time (t) which depends on a thermal time constant (Y) as indicated in the following equation:

$$\theta = \theta_0 e^{-\frac{t}{T}},$$

where ($\theta$) is the change in ($\Delta T$). It was discovered that this response time factor (Y) is directly related to the mass of the body 12 in the measurement zone or the axial length of the axial thermal resistance space 22 (2L). This relationship between axial space length and thermal response time is useful in designing a sensor with a rapid thermal response by reducing the axial length of the reduced diameter portion and yet maintain the signal large enough above noise level to measure heat rate.

Figure 3:
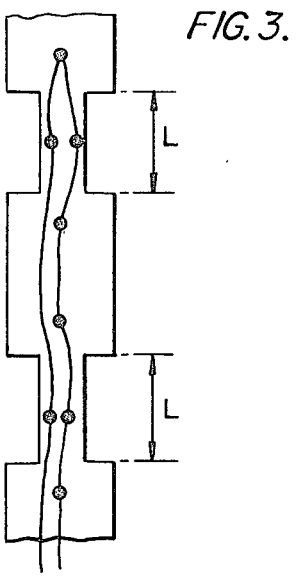
FIG. 3 is a schematic illustration of another embodiment.

FIG. 3 illustrates schematically, an embodiment in which the advantages of the present invention may be extended by interconnecting in series the thermocouple junctions associated with two adjacent reduced diameter portions of the sensor body for a single measurement zone. Each reduced diameter portion is one-half the axial length of the portion 20 for the independent double differential thermocouple type sensor 10 of FIG. 1. The following chart compares various thermocouple arrangements hereinbefore referred to with respect to the relationships between response time, space length and signal change.

| Type of Thermocouple | (2L) Total space Length (mm) | (θ) Change in Signal (Degrees) | (t) Response Time (Seconds) |
|---|---|---|---|
| Single differential | 8 | 7½ | 2½ |
| Double differential (FIG. 1) | 8 | 15 | 2½ |
| Two double in series (FIG. 3) | 8 (4 + 4) | 7½ | ⅝ |

Figure 4:
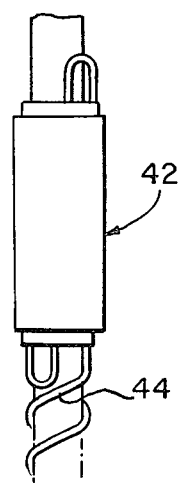
FIG. 4 is a side elevation view of yet another embodiment.
Figure 5:
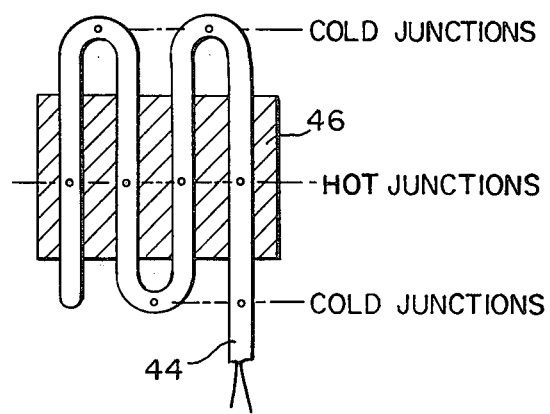
FIG. 5 is a simplified section view illustrating the thermocouple arrangement associated with the embodiment of FIG. 4.

FIG. 4 illustrates another type of gamma ray sensor to which the improvement of the present invention may be applied through a thermocouple device having series connected junctions enclosed in a single cable 44. As shown in FIG. 5, the cable 44 extends through a heat conductive body 46 of the sensor constituting a hot region of the measurement zone. Four parallel spaced loop portions of the cable containing four hot junctions are embedded in body 46 while cold junctions at the loop ends are positioned within cold regions of the measurement zone. The same advantages of eliminating signal error because of asymmetrical heat flow and increasing signal strength are applicable to this embodiment.

Figure 6:
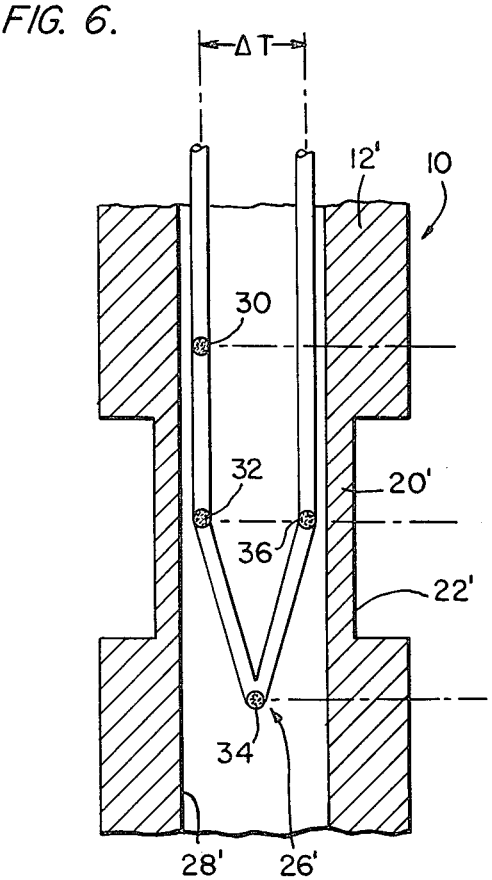
FIG. 6 is a partial side section view of a sensor assembly in accordance with a radial heat flow embodiment.
Figure 7:
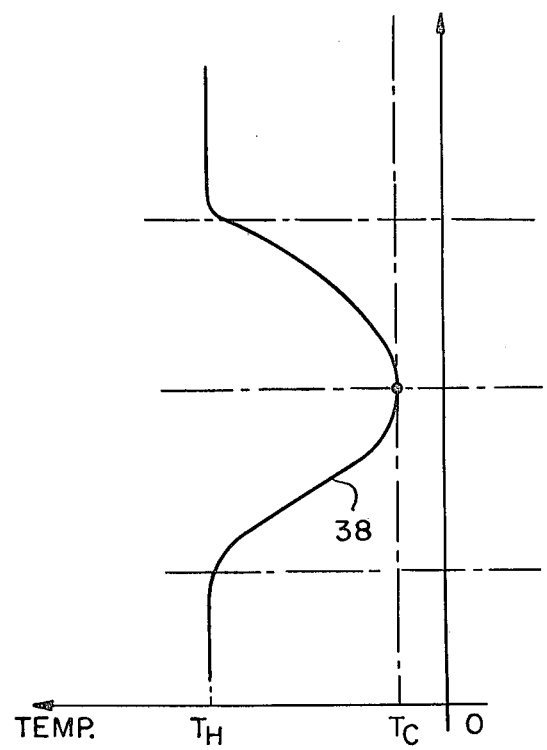
FIG. 7 is a graphical representation of the temperature gradient associated with the assembly in FIG. 6.

FIG. 6 shows a radial heat flow type of gamma sensor 10' wherein the heater body 12' is exposed to coolant throughout its external surface at which a uniform heat sink temperature is established. Accordingly, the cold region of the measurement zone is established coextensive with the reduced diameter portion 20', while hot regions are formed on both axial sides thereof, as depicted by the temperature gradient curve 38' in FIG. 7. A thermocouple device 26' similar to that shown in FIG. 1 for sensor 10 is utilized for sensor 10' and is mounted within central bore 28' of sensor body 12'. The thermocouple device 26' has also four signal producing junctions 30', 32', 34' and 36' interconnected in series to produce a signal output of twice the level of a two junction type of thermocouple device. However, no signal error correction is involved herein because there is no axial heat flow pattern subject to asymmetrical heat flow errors as is the case of sensor 10 hereinbefore described.

The advantage of utilizing the plural differential thermocouple arrangement for a radial heat flow type of gamma sensor, resides in the increase in the signal output obtained without increasing the mass of the sensor body and the achievement of a faster signal response at a suitable signal level. This is particularly desirable for a boiling water reactor installation utilizing a radial heat flow type of sensor having an intrinsically lower signal level output as compared to an axial heat flow type of sensor.

Figure 8:
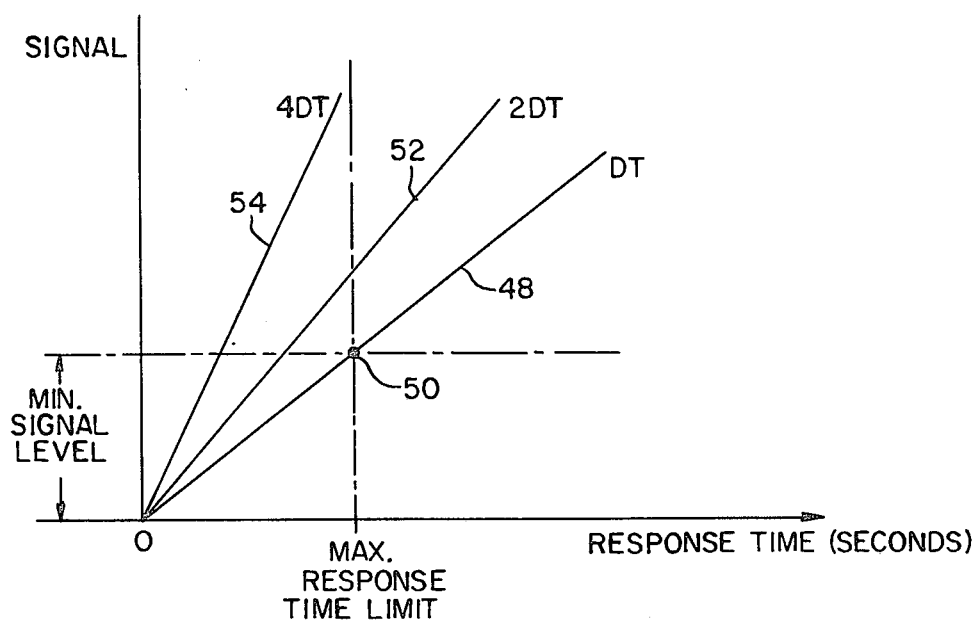
FIG. 8 is a graphical illustration of comparative signal response characteristics.

The significance of the present invention is illustrated in FIG. 8, graphically showing signal level vs. signal response time curves determined for a constant heat flow rate. Curve 48 represents the signal characteristic obtained from a single double junction thermocouple arrangement heretofore utilized for gamma sensors. At some point 50 on curve 48, a minimum signal level is determined, below which power measurement accuracy is unreliable. Also, point 50 on curve 48 represents the maximum desirable time limit above which signal response is too slow for safety system operation. When utilizing a thermocouple arrangement for the sensor of the type shown in FIG. 6, a signal curve 52 is obtained as shown in FIG. 8. Curve 54 in FIG. 8 represents the signals obtained from a four differential junction pair type of thermocouple such as that shown in FIG. 3. Thus, signal ranges reflected by curves 52 and 54 within the response time limit may be selected above the mimimum signal level by practice of the present invention.

What is claimed is:

1. In combination with a power monitoring sensor for a nuclear reactor, including an axially elongated body internally heated by gamma radiation and differential temperature sensing means mounted internally within said body for measuring temperatures therein, said body having axially spaced thermal resistance portions establishing differential temperature regions including a relatively hot region located axially between two relatively cold regions, said temperature sensing means having two axially spaced thermocouple junctions interconnected in series and respectively located centrally within the hot region and in one of the two cold regions to produce a differential temperature signal, the improvement residing in means for eliminating signal error from the temperature signal arising from axially asymmetrical heat distribution in the body, comprising additional thermocouple junctions connected in series with said two junctions, at least one of the additional junctions being located in the other of the two cold regions within the body and another of the additional junctions being located centrally within the hot region of the body.

2. A device for measuring differences in temperature between a relatively hot-region and one of two relatively cold regions within a thermal measurement zone of a sensor body, comprising a first thermal sensing element having a junction in the hot region whose temperature is to be compared with temperature in said one of the two cold regions, a second thermal sensing element having a junction in said one of the cold regions fixedly spaced from the junction of the first thermal sensing element and relatively distant therefrom, a third thermal sensing element having a junction in the hot region relatively close to the junction of the first thermal sensing element producing a potential responsive to the temperature in the hot region, a fourth thermal sensing element producing a poyential responsive to temperature in the other of the two cold regions having a junction fixedly spaced and relatively distant from the junction of the second thermal sensing element, the fixed spatial relationship between the fourth and second thermal sensing elements being disimilar to the fixed spatial relationship between the junctions of the third and first thermal sensing elements, means connecting all of the thermal sensing elements electrically in series, and means for measuring the difference in potential across all of the series connected thermal sensing elements as a temperature differential free of error resulting from asymmetrical heat distribution in said sensor body.

3. In a sensor assembly for measuring heat flow rate through a common heat conductive body having an external heat sink surface, and a differential temperature sensing device mounted internally of said body for generating a differential temperature signal at a predetermined local measurement zone having a plurality differential temperature regions in the common body that are alternately hot and cold relative to each other, the improvement residing in eliminating signal error in the temperature signal wherein said differential temperature sensing device includes at least four spaced signal producing means connected in series, and means internally mounting two of said signal producing means within one of the regions of the measurement zone and internally mounting each of the other of the signal producing means within the other of the regions, respectively.

4. The assembly as defined in claim 1 wherein the heat conductive body is provided with a reduced diameter portion substantially coextensive with said one of the regions of the measurement zone to establish the differential temperature between said regions.

5. The assembly as defined in claim 2 wherein said heat conductive body is internally heated by gamma radiation.

6. The assembly as defined in claim 3 wherein said signal producing means are hot and cold thermocouple junctions.

7. The assembly as defined in claim 4 wherein said mounting means for the temperature sensing device is a central bore within the heat conductive body.

8. The assembly as defined in claim 1 wherein said heat conductive body is internally heated by gamma radiation.

9. The assembly as defined in claim 1 wherein said signal producing means are hot and cold thermocouple junctions.

10. The assembly as defined in claim 1 wherein said mounting means for the temperature sensing device is a central bore within the heat conductive body.

11. The assembly as defined in claim 7 wherein said mounting means includes a single cable enclosing the hot and cold thermocouple junctions connected in series.

12. The assembly as defined in claim 9 wherein said single cable is formed with parallel spaced loop portions positioned within the heat conductive body and extending through the measurement zone.

13. In a heat flow rate monitoring assembly having an axially elongated sensor body and a differential temperature sensing device internally sensing temperatures of said body at axial locations in adjacent hot and cold regions of a measurement zone in the sensor body, wherein the peak temperature may be axially offset from the temperature sensing location in the hot region of the measurement zone because of asymmetrical heat flow in the sensor body, the improvement residing in said sensing device having a plurality of signal producing devices at said location in the hot region and one-half of said plurality of devices at each of locations in both of the cold regions on opposite axial sides of the hot region of the measurement zone, and means interconnecting said signal producing devices in series for producing a differential temperature signal free of error resulting from said offset of peak temperature from the location of the signal producing devices in the hot region of the measurement zone.

14. The improvement as defined in claim 11 wherein said signal producing devices includes a single thermocouple junction at each of the locations in the cold regions of the zone and two thermocouple junctions at the location in the hot region of the zone.

* * * * *